United States Patent [19]

Holmberg et al.

[11] 4,447,481

[45] May 8, 1984

[54] PAPER SHEETS HAVING RECESSED PRESSURE-SENSITIVE GLUED EDGE WITH A REMOVABLE STRIP

[75] Inventors: Albert E. Holmberg, Edina; Thomas A. Holmberg, Richfield, both of Minn.

[73] Assignee: The Holmberg Company, Minneapolis, Minn.

[21] Appl. No.: 512,326

[22] Filed: Jul. 11, 1983

[51] Int. Cl.³ .................... B32B 3/02; B32B 29/00
[52] U.S. Cl. ................................ 428/40; 428/161; 428/189; 428/192; 428/194
[58] Field of Search ............... 428/40, 156, 194, 192, 428/354, 161.41, 343, 914, 189; 156/249, 292; 282/27.5

[56] References Cited

U.S. PATENT DOCUMENTS 3,297,508   1/1967   Jahp .................................. 156/249

Primary Examiner—Paul J. Thibodeau
Attorney, Agent, or Firm—John W. Adams

[57] ABSTRACT

A paper sheet having a recess along one edge thereof with a non-drying adhesive applied in said recess and a removable protective strip covering said adhesive, the combined thickness of said adhesive and strip being substantially equal to the depth of said recess to provide a sheet of uniform thickness having a protected pressure-sensitive adhesive edge.

6 Claims, 7 Drawing Figures

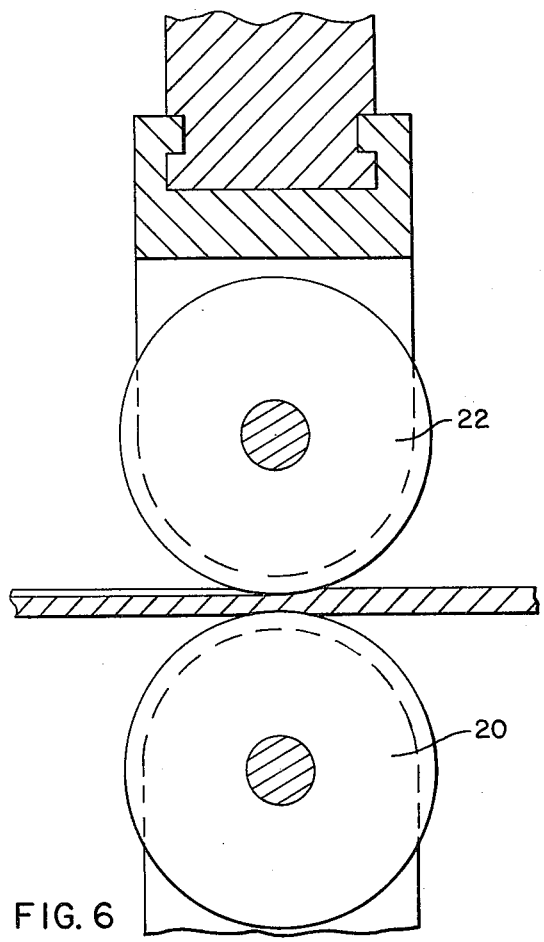
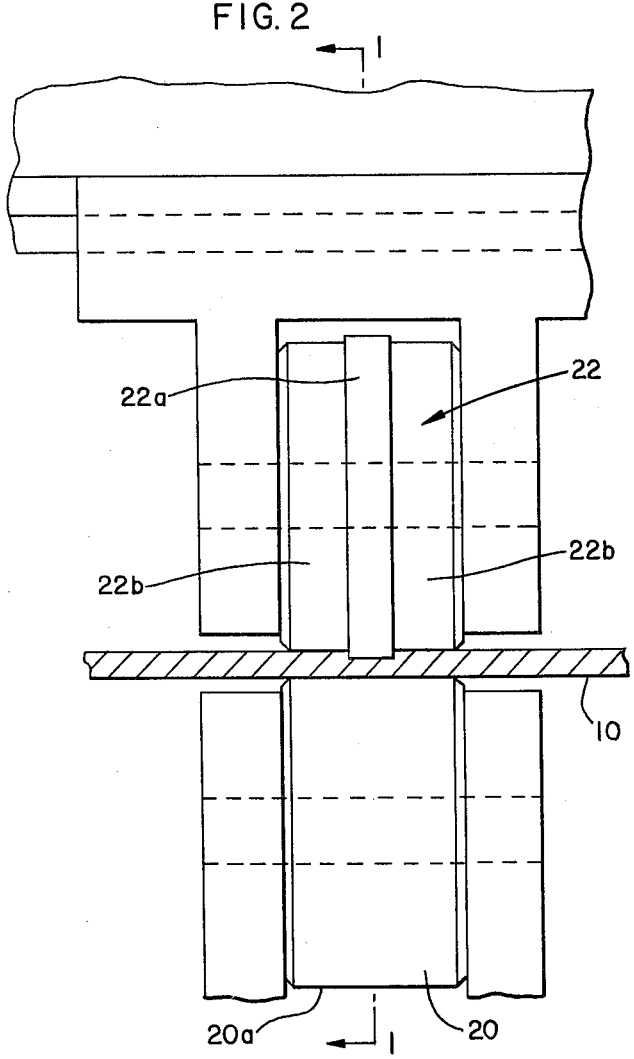
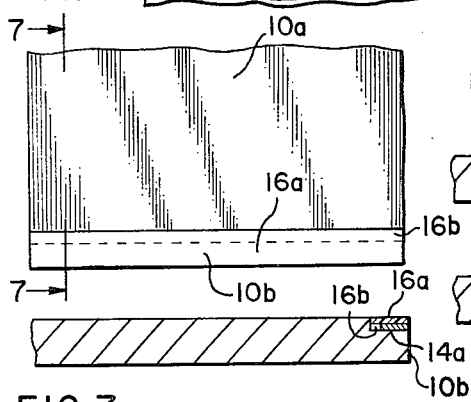
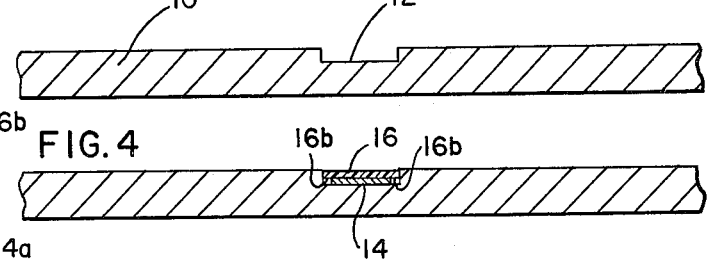
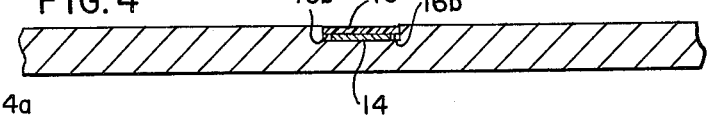
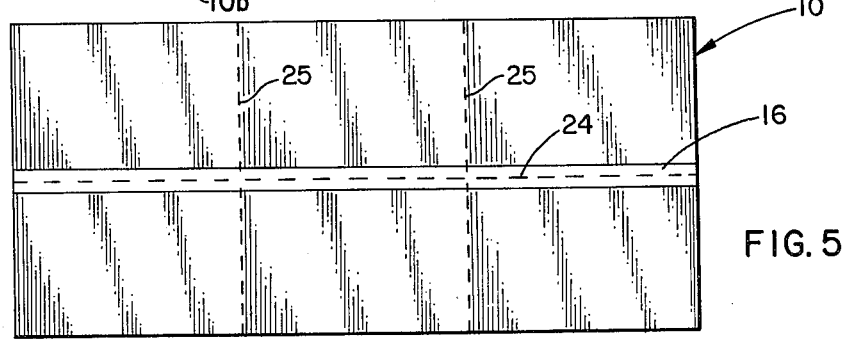

PAPER SHEETS HAVING RECESSED PRESSURE-SENSITIVE GLUED EDGE WITH A REMOVABLE STRIP

BACKGROUND OF THE INVENTION

In the past, paper stock having protected pressure-sensitive adhesive applied only to a marginal edge portion thereof has been incapable of being processed because of the added thickness to the edge portion produced by the adhesive and protective strip thereon. This prevents the sheets from being stacked for printing, or die cutting as is required for making envelopes, or from being copied on a conventional copy machine. In the past, the only alternative to the thickened glued edge has been to apply the glue and protective sheet to the entire under surface of the paper as when pressure-sensitive name tags and the like are being produced. This is obviously expensive and unnecessary when only a pressure-sensitive glued edge is required.

SUMMARY OF THE INVENTION

The present invention provides a versatile paper sheet which can be processed through normal printing, copying, and die stamping operations where the sheets are stacked and must be of uniform thickness throughout their entire surface area. This construction provides a pressure-sensitive glued edge with a suitable protective strip overlying the adhesive portion with both the adhesive and protective strip being received in a preformed groove having the same depth as the aggregate thickness of the adhesive and strip, so that the thickness of the sheet is uniform throughout its entire surface area.

The use of the protective strip over the pressure-sensitive adhesive surface portion not only provides a sheet having an attachment portion along a marginal edge thereof when the protective strip is removed, but also provides a sheet of uniform thickness which has a reinforced marginal edge portion for use in loose leaf binders and the like, if the protective strip is not removed and is made from suitable reinforcing material such as mylar or the like.

DESCRIPTION OF THE DRAWINGS

FIG. 1 is a vertical sectional view taken substantially along the line 1—1 of FIG. 2 showing apparatus for providing a recess in a sheet of paper;

FIG. 2 is a front elevational view thereof;

FIG. 3 is a fragmentary sectional view of a sheet of paper having a recessed groove formed therein;

FIG. 4 is a similar view with the adhesive and protective strip applied to the sheet in the recessed groove;

FIG. 5 is a top plan view of a single large sheet adapted to be divided into a plurality of single smaller size sheets for efficiency in manufacturing;

FIG. 6 is a top plan view of an individual sheet; and

FIG. 7 is a vertical sectional view taken substantially along the line 7—7 of FIG. 6.

DETAILED DESCRIPTION OF THE PREFERRED EMBODIMENT

FIGS. 3 and 5 show a sheet of paper 10 which includes a recess groove 12 of predetermined depth formed therein. A ribbon of adhesive 14 is applied in the groove 12 and a protective strip of material 16 is adhered in the groove by said adhesive. The combined thickness of the adhesive 14 and protective strip 16 is no greater than the depth of the recess 12 and is preferably equal to said depth. The ribbon of adhesive is somewhat narrower than the width of the groove 12 to provide a free, unattached strip edge 16b along both sides of the protective strip as best shown in FIG. 4.

Suitable apparatus for forming the groove in the paper sheet 10 is provided, such as a pair of opposed rollers 20 and 22 illustrated in FIGS. 1 and 2. The roller 20 has a smooth uniform outer circumferential cylindrical surface 20a. The two rollers are positioned in opposed, slightly spaced-apart relation and the roller 22 has a raised center portion 22a of larger diameter than the two side portions 22b. As shown in FIG. 2, this raised center portion 22a of the roller 22 compresses the paper to produce a recess 12 of predetermined depth therein. Sheets 10a of the desired dimensions are ultimately produced by cutting the larger double width sheet 10 along the dotted line 24 down the center line of the recess 12 with the adhesive 14 and protective strip 16 applied in the recess. This bisects the protective strip 16 into two strip portions 16a which will then form the adhesive edge 10b of the smaller sheets 10a after the two bisected sheets are cut along the transverse lines 25 illustrated in FIG. 5. The half width glue portion is designated 14a, and the half width protective strip is designated 16a as shown in FIG. 6. The individual sheets 10a having an attachment edge 10b with the adhesive 14a and protective strip 16a formed in the recess portion are shown in FIGS. 6 and 7.

The adhesive material is of two types; one which will permit the sheet to be permanently adhered to a substrate or underlying surface of the other which can be removably attached to the underlying surface and subsequently reattached to the same or a different underlying substrate surface. An adhesive which is found to be suitable for permanent attachment of the paper wheet is a hot melt pressure-sensitive type adhesive Formulation No. 1P84024 manufactured and sold by Swift Adhesives, a division of Eschem Inc. of Chicago, Ill. A reusable adhesive which has proved to be satisfactory is a hot melt pressure-sensitive adhesive No. HM1618 manufactured and sold by the H. B. Fuller Company of St. Paul, Minn. The protective strip 16 may be manufactured from a number of different materials; however, a polyester tape such as Mylar manufactured by Dupont Company of Wilmington, Del., has proved to be satisfactory. Such a polyester tape also serves well to provide a reinforcing strip if the paper sheet is used without removing the protective strip such as would be the case if the paper sheet is used in a loose-leaf ring binder.

The manufactured sheets 10a may be quickly and easily attached to an underlying surface by first removing the protective strip portion 16a to expose the pressure-sensitive adhesive portion 14a. The free, unattached inner edge 16b of the strip 16a facilitates initial lifting of the strip from the adhesive and facilitates removal of the strip. It should be noted that the use of the permanent attachment adhesive permits the number of sheets to be easily bound together along the marginal attachment edges 10b thereof to form a permanently bound-together booklet. The clear space between the edge of the adhesive and the edge of the recess provides a reduced thickness portion of the recess adjacent to the bound-together adhesive portion which in effect, produces a hinge line which, because of its reduced cross-sectional thickness, bends more easily than the adjacent portion of the sheet.

It will be seen that this invention permits a sheet of paper having uniform thickness throughout its entire surface area to be provided which can be processed with conventional equipment after the adhesive and protective covering strip has been applied thereto, while still permitting the sheet to be quickly attached to another sheet either permanently or removably, depending upon the adhesive used, after removal of the protective strip.

It will, of course, be understood that various changes may be made in the form, details, and proportion of the components shown and described without departing from the scope of the invention which is set forth in the appended claims.

What is claimed is:

1. A paper sheet comprising,
    an attachment marginal edge portion,
    a recess formed along said attachment edge portion having a predetermined depth,
    a layer of non-drying, pressure-sensitive adhesive applied only in the recessed marginal edge portion,
    a protective strip removably applied to the layer of adhesive in said recess,
    the combined thickness of the adhesive and protective strip being no greater than the depth of the recess so that the thickness of the attachment marginal edge portion of the paper sheet is no thicker than the remaining portion of the sheet to permit processing of the sheet through a conventional processing operation such as printing and copying in a conventional manner.

2. The structure set forth in claim 1 wherein the combined thickness of the adhesive and the protective strip is substantially equal to the predetermined depth of the recess to produce a marginal edge thickness substantially equal to the thickness of the remaining portion of the sheet.

3. The structure set forth in claim 1 wherein the width of the layer of adhesive is less than the width of the recess, and the width of the protective strip is slightly wider than the layer of adhesive to provide an unattached starting flap along the portion of said strip overlying the portion of the recess to which adhesive has not been applied.

4. The structure as set forth in claim 1 wherein the adhesive is sufficiently aggressive to permanently adhere the sheet to an underlying surface.

5. The structure shet forth in claim 1 wherein the adhesive is of a type to permit the the sheet to be readily removed from an underlying surface to which it has been adhered and to be reattached to an underlying surface.

6. The structure set forth in claim 3 wherein the space between the edge of the recess and the adhesive provides a fold line adjacent to the adhesively attached edge which facilitates bending said sheet along said fold line without removal of the adhesive.

* * * * *